(No Model.)

J. M. RILEY.
KNOB OR PENDANT.

No. 366,612. Patented July 12, 1887.

Witnesses
Edwin I. Yewell,
W. F. Huntemann,

Inventor
John M. Riley
By his Attorneys
Connolly Bros

UNITED STATES PATENT OFFICE.

JOHN M. RILEY, OF NEWARK, NEW JERSEY.

KNOB OR PENDANT.

SPECIFICATION forming part of Letters Patent No. 366,612, dated July 12, 1887.

Application filed December 15, 1886. Serial No. 221,685. (No model.)

*To all whom it may concern:*

Be it known that I, JOHN M. RILEY, a citizen of the United States, residing at Newark, in the county of Essex and State of New Jersey, have invented certain new and useful Improvements in Knobs or Pendants; and I do hereby declare the following to be a full, clear, and exact description of the invention, reference being had to the accompanying drawings, which form part of this specification.

This invention has relation to casings, cages, or inclosing-shells to be applied to balls or spheres of glass or other material designed as ornamental or useful appendages to articles of furniture, chandeliers, curtains, or other objects to which such balls or spheres are applicable.

Heretofore in applying a skeleton cage or casing of sheet metal to a ball or sphere of glass or other solid material in order to provide a convenient means of attachment or suspension it has been usual to form a blank of sheet metal—such as brass—by stamping or cutting, consisting of a center plate or ring, with a series of flat arms extending radially from the center, and to then bend the arms around the ball and secure them by soldering to a suitable ring or plate. This method has entailed considerable labor and expense on account of the difficulty of soldering so as to produce a neat and secure connection, and has suggested to me the expediency of providing a more secure and attractive fastening wherein soldering might be dispensed with, and the arms attached to their clasping-ring by suitable interlocking devices.

My invention accordingly consists in, first, the novel construction and arrangement of the parts constituting the cage or casing, and, secondly, in the combination, with a ball or sphere of glass or other material, of a skeleton cage or casing and a holding-ring secured together by suitable interlocking, as hereinafter specifically described.

Figure 1:
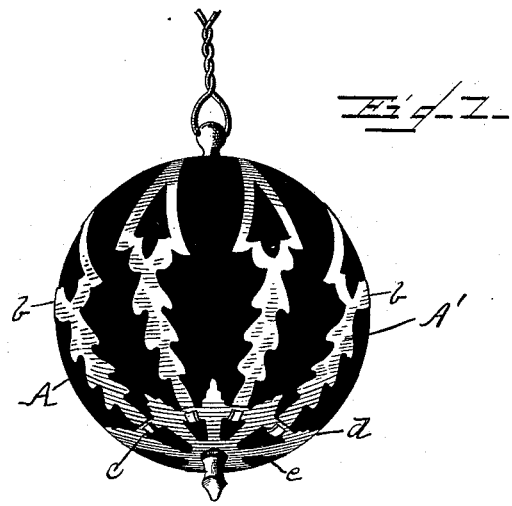
Figure 2:
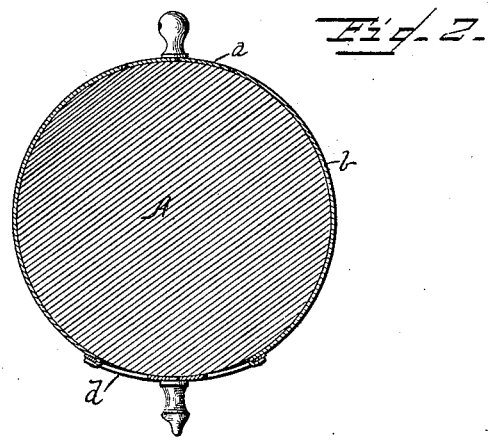

In the accompanying drawings, Figure 1 is a perspective view of a ball or sphere incased in a metallic cage, and adapted to form a pendant or weight. Fig. 2 is a sectional view of the same.

In constructing the cage I stamp or cut from a sheet of brass or other metal a blank composed of a center-piece, $a$, and a series of radial arms, $b\ b$, of any desired contour or ornamental configuration, with diminished ends $c$. I also provide a wheel-shaped or spoked ring or plate, $d$, fashioned according to any desired model, which will afford slots or openings at $e$, and which may be dished or bent to conform to the curvature of the ball and applied thereto above or below the middle part thereof.

In applying the cage to the ball A, I simply bend the arms $b\ b$ around and upon the same, as shown in Fig. 1, and, after laying the plate $d$ upon the ends of said arms, bend back the projecting portions of the latter upon the rim $f$ of the plate $d$, so as to firmly clasp or clinch said rim. By this means the ball will be neatly and securely incased, and may be used for any purpose for which it is appropriate. Knobs, buttons, or other devices, $g$, may be fastened by riveting or otherwise to the centers of the parts A $d$ for use or ornament.

Instead of using a metal wheel shaped plate, $d$, I may use a simple ring. The ball or sphere, incased as described, may be advantageously used as a knob or pull for the drawers of bureaus, tables, &c., and also for doors.

Having described my invention, I claim—

1. As a new article of manufacture, a ball or sphere of glass or other material, with an inclosing-cage of sheet metal, consisting of two parts, to wit: a ribbed plate and a wheel or ring connected together by interlocking, the ribs being extended beyond the diameter of the ball or sphere, and terminating in reversely-bent hooks which engage with the rim of the wheel or ring, substantially as described.

2. The combination, with the ball or sphere A, of the ribbed cage A', and the ring or wheel-shaped plate $d$, the ribs or bars of said cage terminating in hooks which engage with the rim of said wheel or ring, substantially as described.

3. The metal-incased ball or sphere, as described, constituting a knob or pull for drawers or doors.

In testimony that I claim the foregoing I have hereunto set my hand this 6th day of November, 1886.

JOHN M. RILEY.

Witnesses:
 THOMAS C. PROVOST,
 MOSES J. DE WITT.